Dec. 6, 1938.  J. M. MILAN  2,139,417
TRUCK LOADER AND UNLOADER
Filed Dec. 23, 1936  2 Sheets-Sheet 1
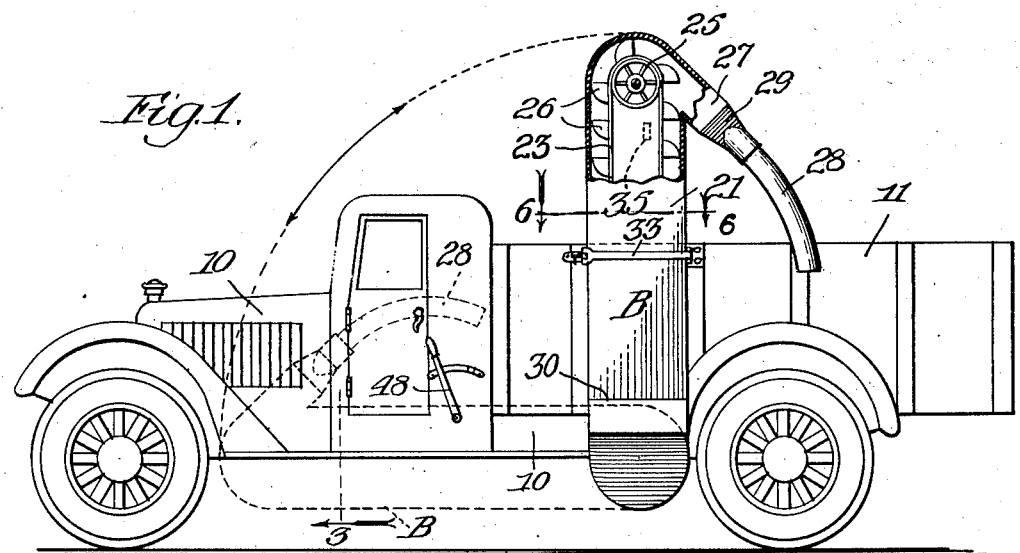
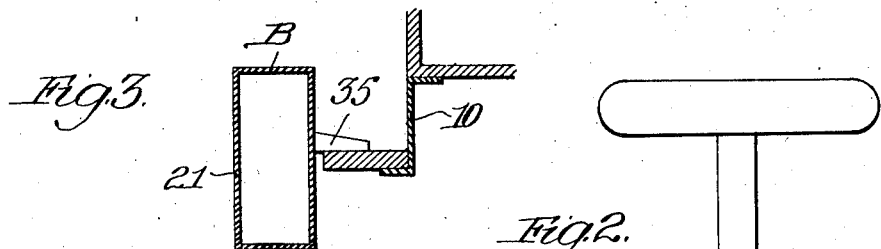
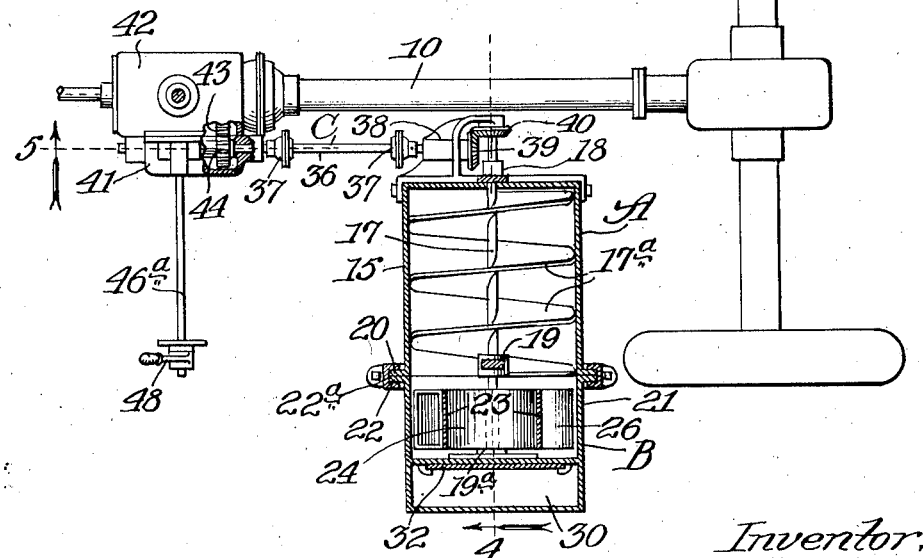
Inventor:
Joseph M. Milan,
By Dyrenforth, Lee, Chritton & Wiles,
Attys.

Dec. 6, 1938.  J. M. MILAN  2,139,417
TRUCK LOADER AND UNLOADER
Filed Dec. 23, 1936  2 Sheets-Sheet 2
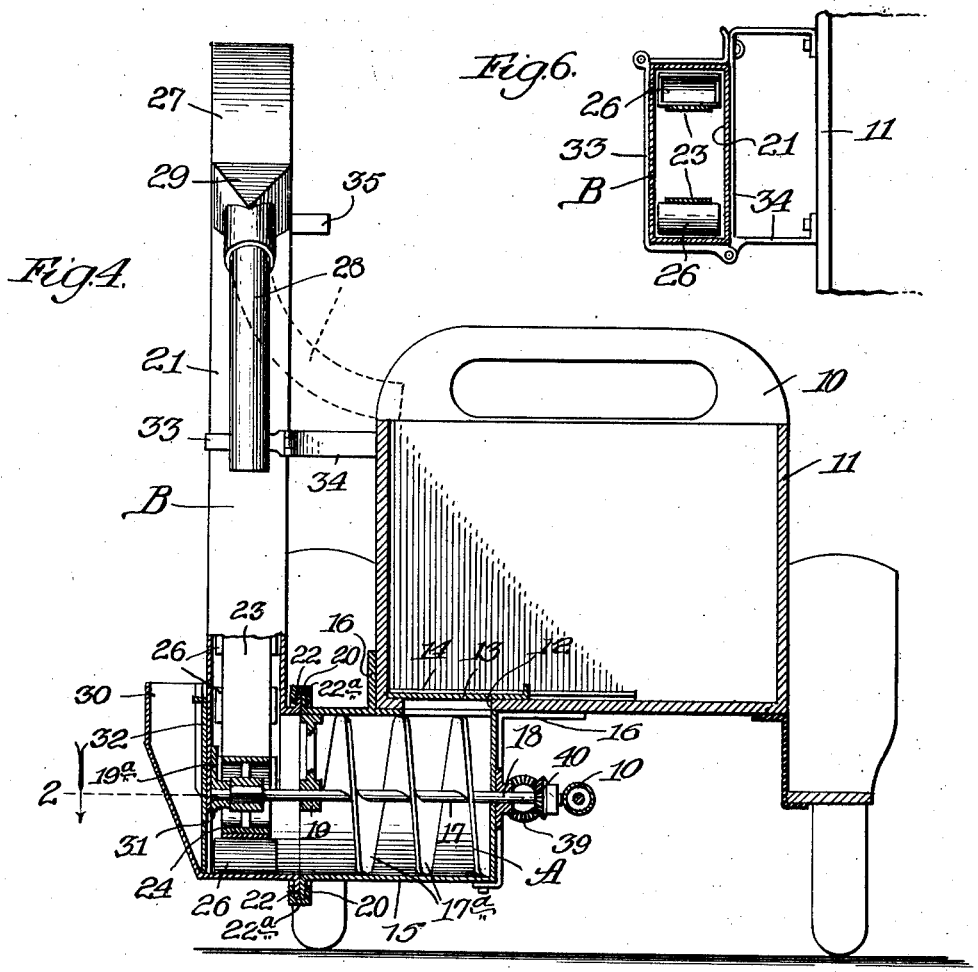
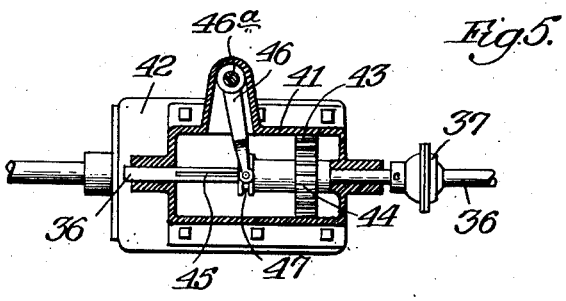
Inventor:
Joseph M. Milan,
By Dyrenforth, Lee, Chritton and Wiles,
Attys.

Patented Dec. 6, 1938

2,139,417

UNITED STATES PATENT OFFICE 2,139,417

TRUCK LOADER AND UNLOADER

Joseph M. Milan, Indianapolis, Ind.

Application December 23, 1936, Serial No. 117,383

5 Claims. (Cl. 214—83)

This invention relates to a truck loader and unloader, and more particularly to mechanism on a motor truck for loading or unloading the truck with grain or other material.

An object of the invention is to provide a mechanism by which a truck may be easily and quickly loaded or unloaded and which is actuated by power supplied by the motor of the truck.

Another object is to provide a truck loader and unloader which is convenient to operate and which allows the truck to pass readily through granary doorways and under overhanging obstructions, the mechanism being carried in lowered position while the truck is in transit.

A further object is to provide a truck loader and unloader which may be utilized either to load the truck or to unload it without reversal of any of the moving mechanism. Other objects will appear as the specification proceeds.

A preferred embodiment of the invention is illustrated in the accompanying drawings in which—

Figure 1 is a view in side elevation of a motor truck equipped with the loading and unloading mechanism, the top portion of the column being shown in section; Fig. 2, a broken plan view of the rear part of the truck chassis, and showing the connection to the transmission of the motor truck, parts of the conveyor being shown in section taken as indicated at line 2 of Fig. 4; Fig. 3, a detail sectional view taken as indicated at line 3 of Fig. 1; Fig. 4, a vertical sectional view taken as indicated at line 4 of Fig. 2; Fig. 5, a detail sectional view of the connection with the motor transmission, the section being taken as indicated at line 5 of Fig. 2; and Fig. 6, a detail sectional view, the section being taken as indicated at line 6 of Fig. 1.

As illustrated, A designates a lateral conveyor; B, a vertical conveyor or elevator; and C, mechanism for connecting the conveyor A with the transmission of the motor truck.

My improved loader and unloader may be used in connection with a truck 10 having a receptacle 11 for carrying grain, gravel, or other material. In the bottom of receptacle 11 is an opening 12 covered by a sliding door 13 held by retaining rails 14. If desired, the bottom of receptacle 11 may be in the form of a hopper with opening 12 at its bottom.

The lateral conveyor A comprises a casing 15 cylindrical in form and containing flanges 16 which are bolted or otherwise secured to the walls of receptacle 11, and the interior of casing 15 communicates with opening 12 in the bottom of the truck receptacle. Within casing 15 is spiral 17ª formed on a horizontal shaft 17 which is journaled at its inner and outer ends respectively in bearings 18 and 19 at the inner and outer ends of casing 15, the outer end portion of shaft 17 being square and extending beyond the outer end of casing 15. The extreme outer end of shaft 17 is reduced in size and adapted to engage a bearing 19ª on the walls of elevator B. Casing 15 is formed into an outwardly extending flange 20 which is adapted to engage a corresponding flange on the elevator B.

The vertical conveyor or elevator B comprises a casing 21 of rectangular cross section which is provided at its bottom with a flange 22 co-extensive with and adjacent flange 20 on conveyor A. A two-piece retaining ring 22ª holds flanges 20 and 22 together and is easily detachable to allow separation of the elevator B from conveyor A. Within casing 21 is an endless bucket lift 23 which is mounted over a lower pulley 24 which is fitted about the outer square portion of shaft 17. The upper end of bucket conveyor 23 is mounted over top pulley 25 which is rotatably secured in casing 21.

At the top of casing 21 and in a position to receive material being brought up by the buckets 26 of bucket conveyor 23 is a casing outlet 27. A tube 28 has its one end connected with outlet 27 by a flexible connector 29 which may be of canvas or other strong flexible material. At the lower portion of casing 21 is attached a hopper 30 which communicates at its lower end with an opening 31 in the outside of casing 21. A door 32 is slidably attached to the walls of hopper 30 and adapted to be moved over opening 31 to close the hopper from casing 21.

The flanged connection between casings 15 and 21 allows the elevator to be swung from a vertical position to a horizontal position. When the elevator B is in vertical or operative position it is secured to the side of the truck by band 33 and bracket 34, bracket 34 being bolted to the side of receptacle 11 and band 33 being mounted on bracket 34. Band 33 is adapted to be quickly released and the elevator B swung to a horizontal position as indicated in dotted lines in Fig. 1. In the horizontal position, the elevator is supported by a lug 35 attached to casing 21 and adapted to rest upon the running board of the truck.

The connecting mechanism C comprises a shaft 36 equipped with two universal joints 37 and mounted at its rear end portion in bearing 38 secured to casing 15 of conveyor A. The end of shaft 36 is equipped with a miter gear 39 which makes toothed engagement with miter gear 40 secured to the end of conveyor shaft 17. At its forward end shaft 36 extends through auxiliary casing 41, as more clearly shown in Fig. 5. Casing 41 is adapted to be bolted to a side of the truck transmission casing 42, this casing being cut away to expose gear 43 to the interior of casing 41. A gear 44 is mounted inside casing 41 on shaft 36 and has internal ridges engaging grooves 45 of the shaft. Thus the gear 44 is arranged to rotate with shaft 36 and is slidable along it to make engagement with gear 43 of the transmission. A lever arm 46 pivoted within casing 41 has its end engaging an annular groove 47 on gear 44. A rod 46a secured to arm 46 connects with hand lever 48 within easy reach of the driver of the truck.

When the truck is to be loaded, the elevator B is fastened by means of band 33 in its vertical position, and tube 28 turned so that its lower end is over the receptacle 11 of the truck. Also slide 32 in hopper 30 is moved to open the hopper to the bottom of the elevator casing. The driver of the truck moves hand lever 48 forwardly which causes arm 46 to move gear 44 rearwardly along shaft 36 and into engagement with gear 43 of the transmission. Power of the truck engine is then applied to shaft 36, and shaft 17 of conveyor A is rotated by reason of the miter gear connection of these shafts. Rotation of shaft 17 causes rotation of pulley 24 and consequently operation of bucket elevator 23. As grain or other material is poured or shoveled into hopper 30 it moves down through opening 31 and into the bottom of elevator casing 21 where it is immediately picked up by buckets 26 and carried to the top of the elevator. As the buckets pass over the top pulley 25 they dump their contents through outlet 27 and into tube 28 which is turned to discharge into receptacle 11 of the truck. After the truck has been loaded, slide 32 may be moved to close opening 31, and the hand lever 48 may be moved rearwardly to throw the conveyor mechanism out of gear.

Then, while the truck is being moved to the place of unloading, band 33 may be loosened, and elevator B turned to a horizontal position so that lug 35 rests on the running board of the truck. In this position the elevator is out of the way and the truck may pass under obstructions as easily as if the loader were not attached.

When the truck is moved to the place of unloading, the elevator B may again be secured in vertical position by band 33. Tube 28 may be turned to discharge into a bin or other container and slide 13 on the bottom of receptacle 11 opened. The grain or other material then passes through opening 12 into conveyor A. When the truck driver pushes his hand lever 48 forward, shaft 17 is set into rotation as before explained and screw 17a causes the material to be carried laterally to elevator B. Upon reaching elevator B, the material is caught by buckets 26 and carried upwardly to the top of the elevator. Discharge from the elevator takes place as before explained and this time the material leaves tube 28 into a bin or other desired container.

From the above operation it is clear that the truck may be either loaded or unloaded by the use of the same mechanism and without reversal of the conveyor movement. The truck may be driven into a field and loaded with grain delivered from a threshing machine, the grain being elevated and poured into the truck without manual handling. Then, while the truck is being moved to the bin or other place of grain deposit, the elevating mechanism can be lowered into unobstructing position to allow the truck to be driven through barn doors and under overhanging wires, etc. At the bin, the grain may be unloaded by the use of the same mechanism, and without any manual handling, the power of the truck engine being employed to move the grain.

When the truck is to be used to haul larger objects and the loading mechanism is not desired, the elevator B may be easily removed by simply removing ring 22a and pulling the elevator laterally from the truck. Ring 22a was purposely formed of two parts so that by loosening the connection between the parts the ring is removed and casings 15 and 21 left free. With the casings free, the elevator may be easily pulled to one side, the shaft 17 sliding loose from bearing 19a and pulley 24.

While the elevator is being used in the loading or unloading of the truck, it should be maintained in substantially vertical position. In the embodiment illustrated, the band 33 and bracket 34 is provided, but other means may be employed for this purpose if desired. Also the elevator may be secured in horizontal position by other means than are here employed.

The mechanism C for connecting with the transmission of the motor truck may be of any common or well known type which is suitable to drive the conveyors at a reasonable speed. Since the device is to be driven in only one direction, no provision is necessary for reverse gearing, and connection need be made only with one gear of the transmission.

The foregoing detailed description has been given for clearness of understanding only, and no unnecessary limitations should be understood therefrom, but the appended claims should be construed as broadly as permissible, in view of the prior art.

I claim:

1. In a truck equipped with a receptacle, an opening in the bottom of said receptacle, a removable closure over said opening, a lateral conveyor communicating with said opening, said conveyor including a cylindrical casing and a spiral, an elevator communicating with said conveyor, said elevator including a casing and a bucket lift, said casing extending upward above the sides of said receptacle but being movable to a position in which its top is below the top of said receptacle, said bucket lift being actuated by said spiral, and means connected with the transmission of said truck for driving said spiral.

2. In a truck equipped with a receptacle, an opening in the bottom of said receptacle, a removable closure over said opening, a lateral conveyor communicating with said opening, said conveyor including a cylindrical casing and a spiral, an elevator communicating with said conveyor, said elevator including an elevator casing and means for lifting materials therein, said elevator casing extending in substantially vertical position but movable to a substantially horizontal position, an exterior inlet opening in said elevator casing, and a hopper adjacent said inlet opening and communicating with said elevator casing.

3. In a truck equipped with a receptacle, an opening in the bottom of said receptacle, a removable closure over said opening, a lateral conveyor communicating with said opening, said conveyor including a cylindrical casing and a spiral, and an elevator communicating with said conveyor, said elevator including a casing and a bucket lift, said casing extending upward above the sides of said receptacle but being movable to a position in which its top is below the top of said receptacle.

4. In a truck equipped with a receptacle, an opening in the bottom of said receptacle, a lateral conveyor communicating with said opening, said conveyor including a cylindrical casing and a spiral, and an elevator communicating with said conveyor, said elevator including a casing and a bucket lift, said casing extending upward above the sides of said receptacle but being movable to a position in which its top is below the top of said receptacle.

5. In a truck equipped with a receptacle, an opening in the bottom of said receptacle, a discharge passage leading from said opening to a point at the side of said truck, and an elevator swiveled to the lower portion of said truck and swingable to a position substantially parallel with the wheel base thereof, said elevator being provided with means for lifting the material from the base of said truck and discharging the same into said receptacle.

JOSEPH M. MILAN.